US006141327A

United States Patent [19]
Kalkunte et al.

[11] Patent Number: 6,141,327
[45] Date of Patent: Oct. 31, 2000

[54] ARRANGEMENT FOR REGULATING PACKET FLOW RATE IN HALF-DUPLEX NETWORKS

[75] Inventors: Mohan V. Kalkunte, Sunnyvale; Ganatios Y. Hanna, Fremont, both of Calif.

[73] Assignee: Advanced Micro Devices, Inc., Sunnyvale, Calif.

[21] Appl. No.: 08/884,658

[22] Filed: Jun. 27, 1997

[51] Int. Cl.[7] .................................................. H04L 12/26
[52] U.S. Cl. .......................................... 370/252; 370/448
[58] Field of Search .................................. 370/274, 279, 370/445, 447, 448, 462, 463, 252, 446, 465, 466, 467, 230, 231, 232

[56] References Cited

U.S. PATENT DOCUMENTS

| 5,418,784 | 5/1995 | Ramakrishnan et al. | 370/85.3 |
|---|---|---|---|
| 5,642,360 | 6/1997 | Trainin | 370/230 |

*Primary Examiner*—Valencia Martin-Wallace
*Assistant Examiner*—Kim T. Nguyen

[57] ABSTRACT

A network station transmitting on a half-duplex Ethernet (802.3) half-duplex media includes a delay credit counter that tracks a delay interval after transmission of a data packet to ensure the network station operates according to an assigned transmission rate. The delay credit counter is decremented by a delay count calculated based on the number of transmitted data bytes and the assigned rate of the network station, and incremented during non-transmitting (i.e., idle) intervals by the network station. The network station defers from transmitting on the half-duplex network media until the delay credit counter has a counter value greater than or equal to zero, resulting in a reduced number of collisions between network stations. In the event of a collision, a network station performs a modified collision mediation based upon the assigned bandwidth, where a range of slot times generated according to the truncated binary exponential backoff (TBEB) algorithm is divided into lower and upper integer ranges, where a network station having a greater assigned bandwidth has a greater probability of selecting the lower range of integers, resulting in a greater probability of winning collision mediation.

18 Claims, 7 Drawing Sheets

ARRANGEMENT FOR REGULATING PACKET FLOW RATE IN HALF-DUPLEX NETWORKS

BACKGROUND OF THE INVENTION

1. Technical Field

The present invention relates to network interfacing and more particularly, to networks and systems controlling network data traffic on half-duplex networks.

2. Background Art

Local area networks use a network cable or other media to link stations on the network. Each local area network architecture uses a media access control (MAC) enabling network interface cards at each station to share access to the media.

The Ethernet protocol ISO/IEC 8802-3 (ANSI/IEEE Std. 802.3, 1993 edition) defines a half-duplex media access mechanism that permits all stations to access the network channel with equality. Traffic is not distinguished or prioritized over the medium. Each station includes an Ethernet interface controller that uses carrier-sense multiple-access with collision detection (CSMA/CD) to listen for traffic on the media The absence of network traffic is detected by sensing a deassertion of a receive carrier on the media. A station having data to send will attempt to access the channel by waiting a predetermined time after the deassertion of a receive carrier on the media, known as the interpacket gap (IPG) interval.

In a traditional half-duplex Ethernet environment, stations contend for access whenever they have a packet to send. If all the stations transmit data to be transmitted on the network such that each station can saturate the network, the overall effect of throughput decreases due to collisions on the network. For example, if two stations simultaneously transmit data on the network, the two stations will collide, halt transmission, and enter a collision mediation, where each station will wait a random number of slot times calculated according to the truncated binary exponential backoff (TBEB) algorithm before attempting access of the media. Hence, an increased number of collisions decreases the overall effective throughput of the network.

Theoretically, each station will on average receive a percentage of throughput which could be on the order of 1/N, where N is the number of stations on the network. However, without any form of integrated mediation, it is not possible to ensure that some stations get higher bandwidth than others. Hence, the network stations are uncoordinated in that each network station will attempt to transmit data when the network media is available, disregarding the bandwidth requirements of other network stations.

SUMMARY OF THE INVENTION

There is a need for an arrangement where network stations in a shared network can transmit data packets according to a prescribed assigned rate.

There is also a need for an arrangement selectively delaying transmission of a second data packet following transmission of a first data packet based upon an assigned transmission rate, the length of the transmitted first packet, and detected network activity of data bytes transmitted by other network stations.

There is also a need for an arrangement for providing collision mediation, where a station having a higher assigned bandwidth relative to another colliding station has a greater probability of winning the collision mediation.

These and other needs are attained by the present invention, where a network station includes a delay credit counter, decremented by a delay count calculated based on the size of the transmitted data packet relative to a prescribed transmission rate and a network media transmission rate, and incremented based on detection of data bytes transmitted by other network stations. The network station uses the delay credit counter to define a delay interval after transmitting the first data packet, where the network station waits until the delay credit counter reaches zero before attempting transmission of the second data packet on the media.

According to one aspect of the present invention, a method in a network station for transmitting data packets onto half-duplex network media comprises transmitting a first data packet of identified size onto the media, determining a delay count based on a prescribed transmission rate, a network media transmission rate, and the identified size, and waiting a delay interval based on the determined delay count and detected network activity following the transmitting step before attempting to access the half-duplex network media for transmission of a second data packet. The determined delay count specifies the actual delay necessary by the network station to ensure the network station transmits at the assigned bandwidth. Moreover, waiting the delay interval based on the delay count and, detected network activity following the transmission step ensures that the network station defers to other network stations until an appropriate number of bytes have been transmitted by other network stations in order to satisfy the assigned station rate.

Another aspect of the present invention provides a network interface for connection with half-duplex network media, comprising a transmit buffer for storing a first data packet to be transmitted on the half-duplex network media, a buffer controller configured to determine a size of the first data packet, and a media access controller for transmitting the first data packet on the network media. The media access controller is configured to wait at least a delay interval after the transmission of the first data packet before transmitting a second data packet onto the network media, and determines the delay interval based on the first data packet size, a prescribed transmission rate relative to a network media transmission rate, and detected bytes transmitted by another network station. Hence, the media access controller transmits data according to the prescribed transmission rate, which generally is a percentage of the network media transmission rate. Thus, a plurality of such network interfaces can transmit data on a network according to the respective prescribed transmission rates, reducing the number of collisions and improving network throughput.

Still another aspect of the present invention provides a method of mediating collisions encountered on a network media in a network station, comprising detecting a collision on the network media during transmission of a data packet, determining a number of access attempts for transmitting the data packet, providing a range of integers based on an exponential number of the access attempts, dividing the range of integers into a lower range and an upper range, selecting one of the lower range and upper range according to a probability corresponding to the prescribed transmission rate relative to the network media transmission rate, and randomly selecting an integer from the selected range and using the selected integer to identify an integer multiple of slot times as a collision backoff interval. The selection of either the lower or upper range of integers according to a probability corresponding to the prescribed transmission rate provides greater consistency in maintaining the prescribed transmission rate, as network stations having a higher prescribed transmission rate will have a greater probability of selecting the lower range of slot times. Moreover, dividing the range of integers into lower and upper ranges minimizes the number of repeat collisions, further improving overall network bandwidth efficiency.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention is directed to regulating flow of packets from a network station according to a prescribed transmission rate (i.e., an assigned rate) in a shared environment. A description will first be provided of an exemplary network interface, followed by a description of the arrangement for transmitting data packets onto half-duplex network media according to a prescribed transmission rate according to the present invention.

Figures 1, 1A:
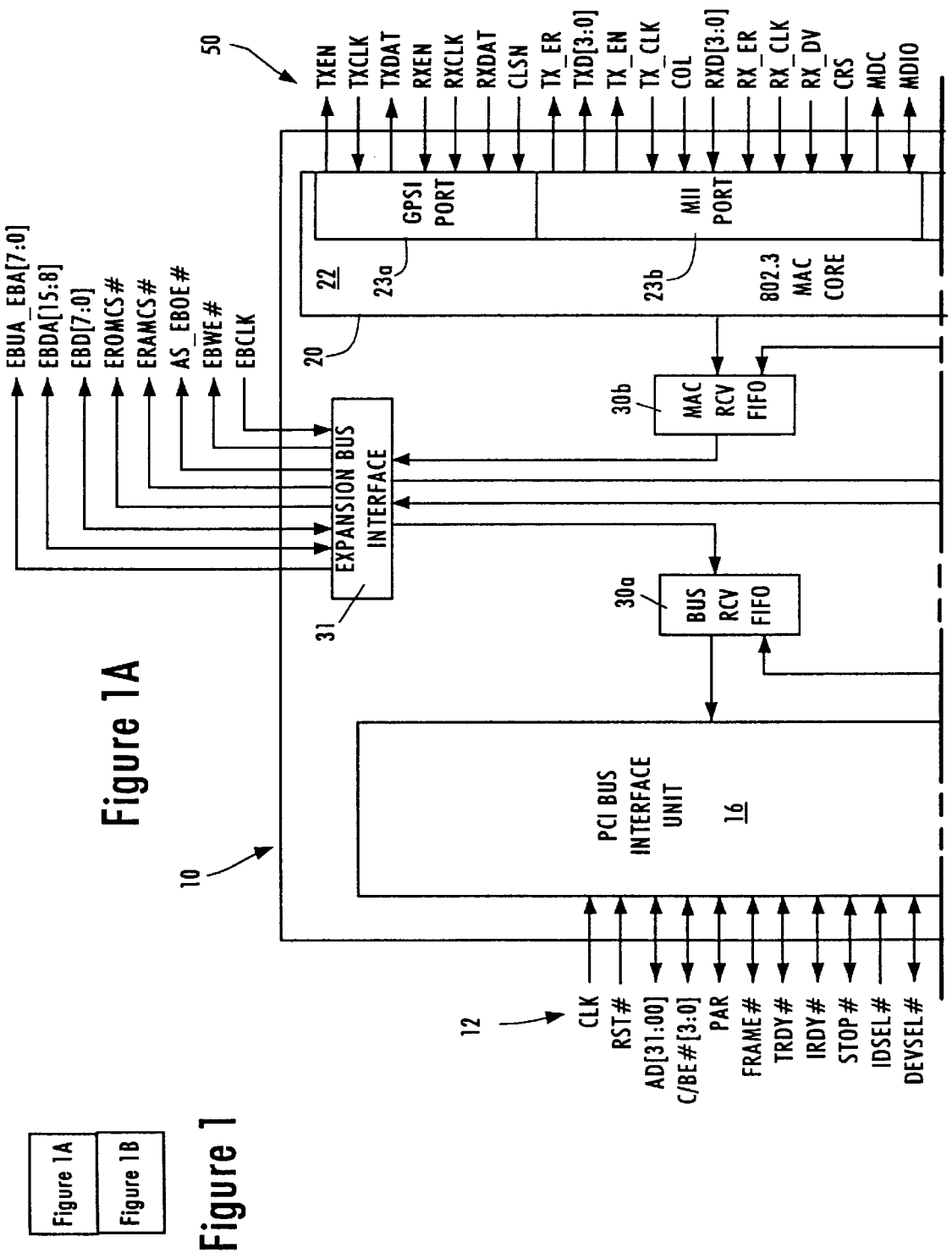
FIGS. 1, 1A and 1B are block diagrams of a network interface according to an embodiment of the present invention.
Figure 1B:
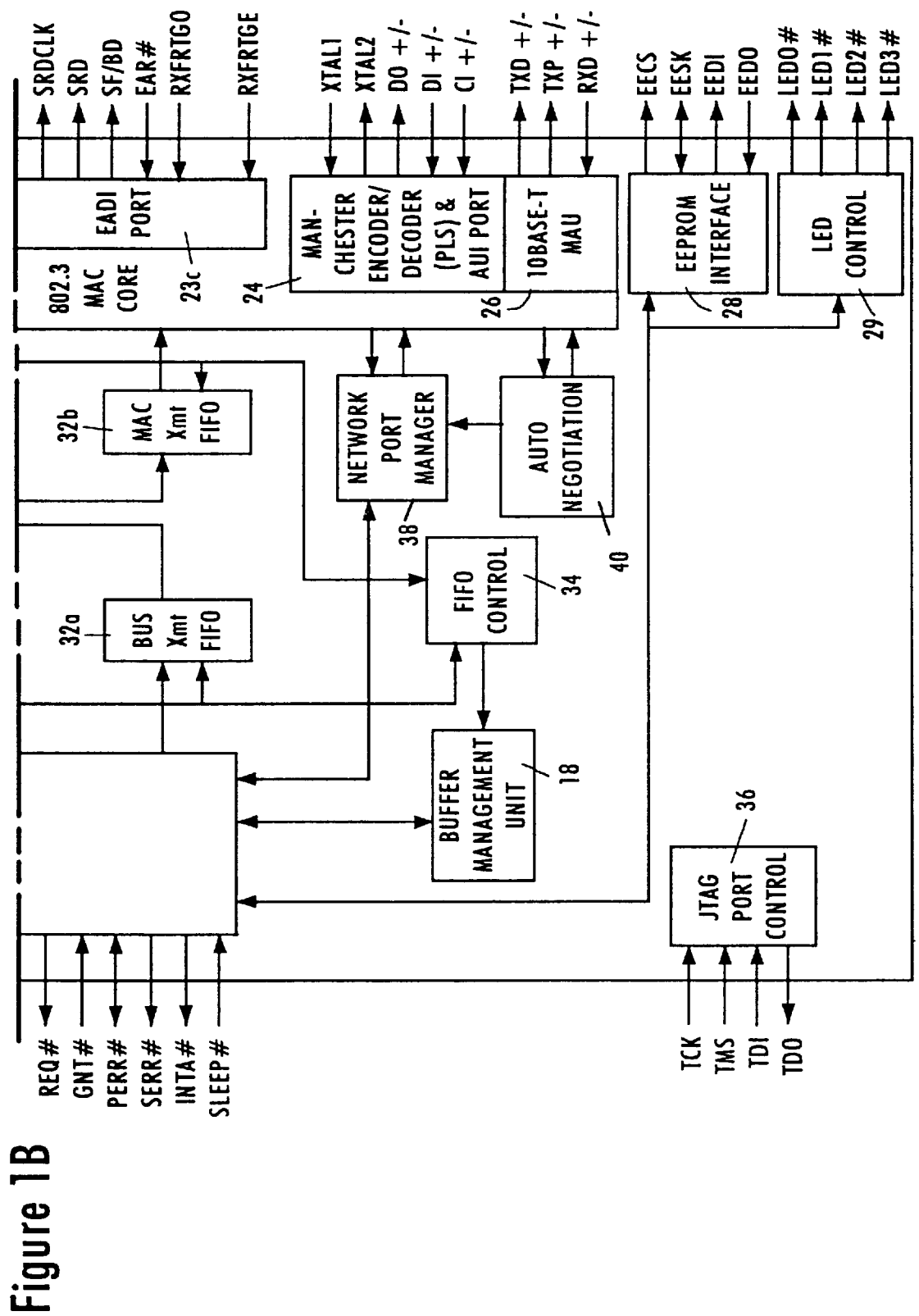

FIG. 1 is a block diagram of an exemplary network interface 10 that accesses the media of an Ethernet (ANSI/IEEE 802.3) network according to an embodiment of the present invention. The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the Am79C971 PCnet™-FAST Single-Chip Full-Duplex Ethernet Controller for PCI Local Bus, disclosed in Preliminary Data Sheet Publication #20550, Rev. B, Issue Date May, 1996, from Advanced Micro Devices, Inc., Sunnyvale, Calif.

The interface 10 includes a PCI bus interface unit 16, a direct memory access (DMA) buffer management unit 18, and a network interface portion 20. According to the disclosed embodiment, the network interface portion 20 operates in half-duplex mode. The network interface portion 20 includes a media access control (MAC) core 22, a General Purpose Serial Interface (GPSI) 23a, a Media Independent Interface (MII) 23b for connecting external 10 Mb/s or 100 Mb/s transceivers, an External Address Detection Interface (EADI) 23c, and attachment unit interface (AUI) 24, and a twisted-pair transceiver media attachment unit (10BASE-T MAU) 26. The AUI port 24 follows the specification ISO/IEC 8802-3 (ANSI/IEEE 802.3). The interface 10 also includes an EEPROM interface 28, a LED control 29, and an expansion bus interface 21 for boot RAM (e.g., EPROM or Flash memory) during startup, and an IEEE 1149.1 -compliant JTAG Boundary Scan test access port interface 36.

The network station 10 also includes a PCI bus receive first in first out (FIFO) buffer 30a, a MAC receive FIFO buffer 30b, a PCI bus transmit FIFO buffer 32a, a MAC transmit FIFO buffer 32b, and a FIFO controller 34.

The PCI bus interface unit 16, compliant with the PCI local bus specification (revision 2.1), receives data frames from a host computer's memory via the PCI bus 12. The PCI bus interface unit 16, under the control of the DMA buffer management unit 18, receives transfers from the host computer memory via the PCI bus 12. The data frames received from the PCI bus interface unit 16 are passed to the PCI bus transmit FIFO buffer 32a, and subsequently to the MAC transmit FIFO buffer 32b.

The buffer management unit 18 manages the reception of the data by the PCI bus interface unit 16 and retrieves information from header bytes that are transmitted at the beginning of transmissions from the host computer memory via the PCI bus 12. The header information identifying the byte length of the received frame is passed to the FIFO control 34.

The network interface 10 includes a network port manager 38, and an auto-negotiation unit 40. The auto-negotiation unit 40 communicates via the media 50 with a corresponding auto-negotiation unit in the hub serving the network interface 10, described below.

Figure 2:
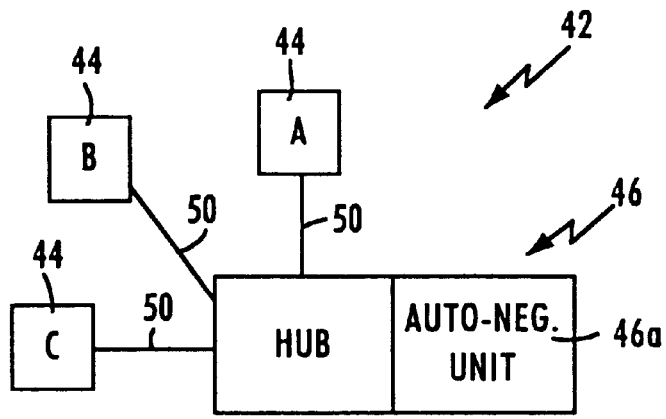
FIG. 2 is a diagram illustrating a network configuration of stations having the network interface of FIG. 1.

FIG. 2 is a diagram illustrating a network 42 connecting three network stations 44 by a network media 50 to a hub 46. The media 50 may be either coaxial, fiber optic, or twisted-pair wire, and hence may couple the interface 10 of each corresponding station 44 to 10BASE-T, 10BASE-2, 100BASE-TX, 100BASE-T4, or 100BASE-FX networks. The network 40 may operate at 10 megabits per second (10 Mb/s), 100 megabits per second (100 Mb/s), or 1000 megabits per second (1000 Mb/s).

The hub 46 is implemented as a repeater or switch that sends and receives data packets to the stations 44. The hub 46 includes an auto-negotiation unit 46a that performs auto-negotiation functions with each of the network stations 44 with respect to physical layer protocol. For example, the auto-negotiation unit 46a includes a link start-up procedure each time a link to a station 44 is connected, powered on or reset. During auto-negotiation, the hub 46 automatically configures each station 44 for operating according to the network configuration parameters, for example, network topology, signaling, distance to hub, and number of stations on the network.

Upon completion of the auto-negotiation process by the hub 42, the network station interface 10 in each station 44 will receive and store network configuration data, described below. Additional details regarding repeaters and auto-negotiation are disclosed in Breyer at al. "Switched and Fast Ethernet: How It Works and How to Use It", Ziff-Davis Press, Emeryville, Calif. (1995), pp. 60–70, and Johnson, "Fast Ethernet" Dawn of a New Network", Prentice-Hall, Inc. (1996), pp. 158–175.

As described above, the present invention is directed to regulating flow of packets from the network interface 10 onto the half-duplex media 50 according to an assigned rate in a shared environment. In a shared environment, each station 44 can transmit independently, which may result in a collision during simultaneous transmission, followed by collision resolution and retransmission. As described below, the present invention controls transmission by a network station to an assigned rate using a counter, referred to as a delay credit counter, which keeps track of bandwidth credit for the corresponding network station 44. According to the disclosed embodiment, a station having a positive credit (e.g., where the delay credit counter value is greater than or equal to zero) can transmit the next packet available in the transmit FIFO 32. On the other hand, a station having negative credit in its delay credit counter is not free to transmit until the value in the delay credit counter is zero or positive.

Each network station maintains the corresponding prescribed transmission rate by determining a delay count based on the prescribed transmission rate, the network media transmission rate, and the identified size. The delay credit counter is decremented by the delay count following transmission of a data packet, and incrementeld each time the network station detects a data byte transmitted by another network station. Hence, the network station defers transmission of a data packet until a sufficient number of data bytes have been transmitted by other network stations to enable the delay credit counter to pass zero.

Figure 3A:
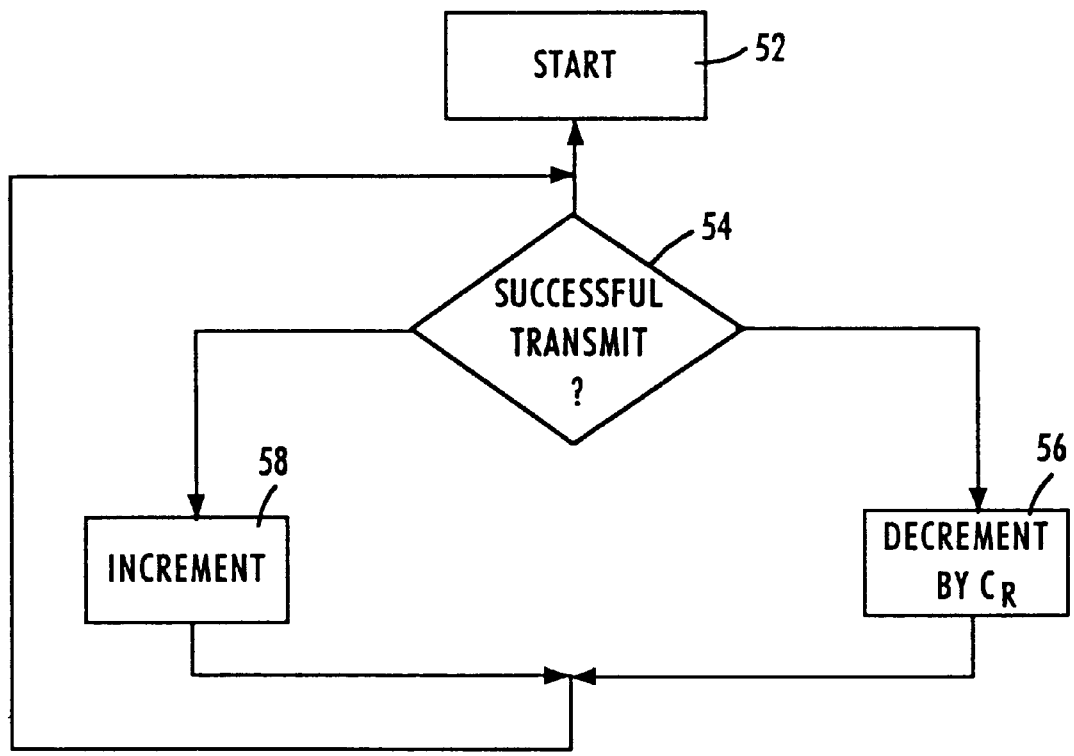
FIGS. 3A and 3B are flow diagrams summarizing a method in a network station of transmitting data packets according to an embodiment of the present invention.
Figure 3B:
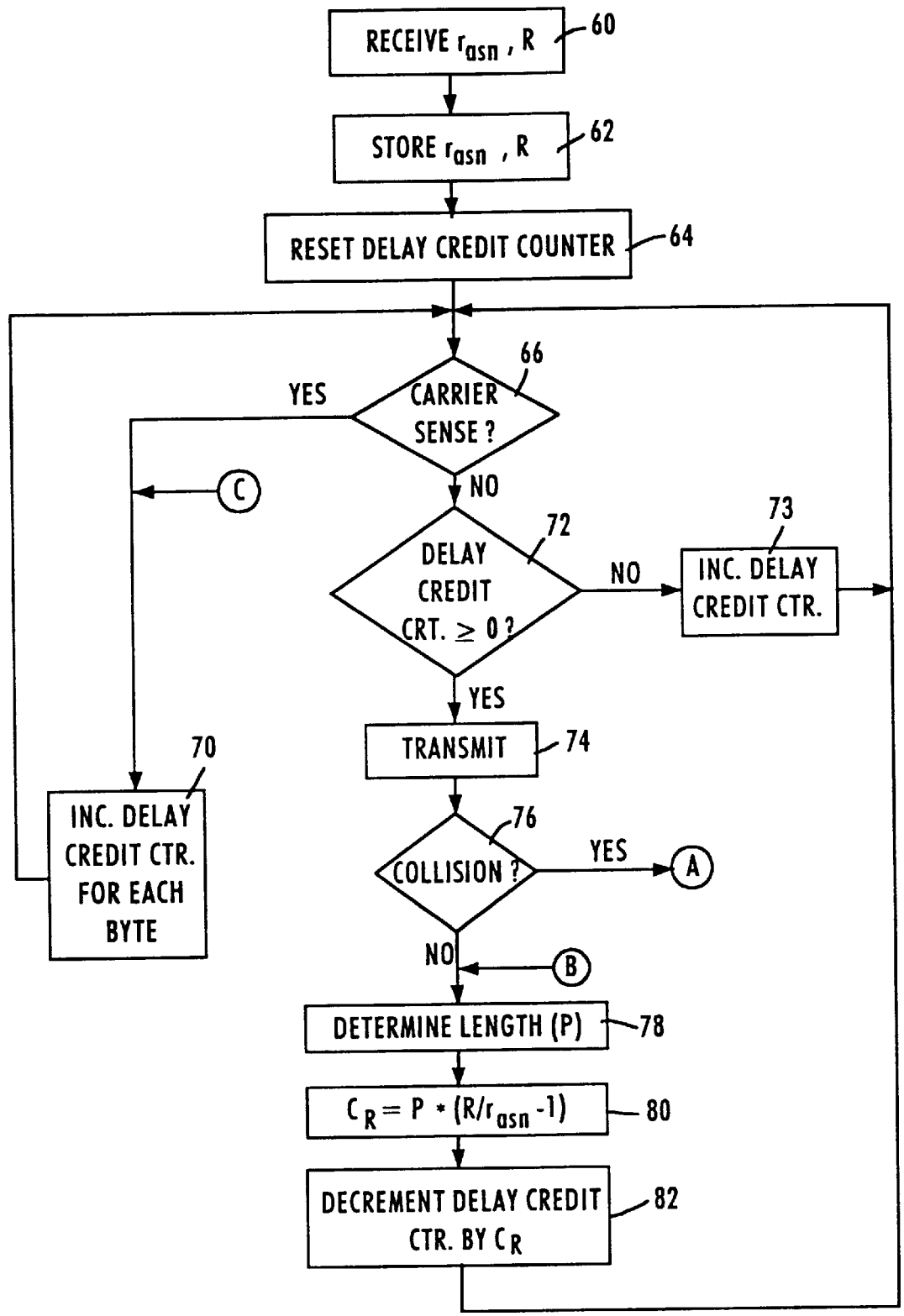

FIGS. 3A and 3B are diagrams of the method for transmitting data packets according to an embodiment of the present invention. FIG. 3A is a flow diagram illustrating operation of the delay credit counter to keep track of bandwidth credit for the corresponding network station 44. As shown on FIG. 3A, operation of the delay credit counter begins after initialization in step 52 by a determination in step 54 whether transmission of a data packet by the network station was successful. If the MAC 22 determines in step 54 that transmission was successful by the network station, then the credit counter is decremented in step 56, described in detail below. However, if the MAC 22 is in a state other than having successfully transmitted a packet, the delay credit counter is incremented in step 58. As described below, the delay credit counter will be incremented during idle intervals, during intervals in which the network station is deferring to other stations, during collision backoff intervals, etc. Hence, the delay credit counter can be considered as constantly incrementing its internal value except during instances where the network station has successfully transmitted a data packet, at which point the delay credit counter is decremented by a prescribed count, described in detail below.

FIG. 3B is a diagram of a method for transmitting data packets from the perspective of the MAC 22. The method begins in step 60, where the network interface 10 receives an assigned transmission rate ($r_{asn}$), also referred to as the prescribed transmission rate, and the network data rate R. The assigned transmission rate may be provided, for example, by a management entity. The network media transmission rate (R) may have a value, for example of 10 Mb/s, 100 Mb/s, or 1000 Mb/s, and the assigned transmission rate ($r_{asn}$) may have a corresponding value of 20%, 30%, or 40% of the network media transmission rate (R).

After obtaining the assigned rate ($r_{asn}$) and the network media transmission rate (R), the MAC 22 stores the received transmission rates in internal memory, for example registers as described with respect to FIG. 5 below. The MAC 22 then resets in step 64 a delay credit counter 162 to zero (corresponding to step 52 in FIG. 3A), and begins to detect network activity in step 66.

Assuming the network interface 10 has transmit data stored in the transmit FIFO 32, the MAC 22 checks in step 66 if a receive carrier is sensed on the half-duplex media 50. If the MAC 22 senses a receive carrier, the MAC defers to the network activity and increments the delay credit counter 162 in step 70 (corresponding to step 58 of FIG. 3A) for each valid data byte, and returns to step 66.

Hence, the delay credit counter 162 is incremented in step 70 during intervals in which the network station is deferring to other network stations transmitting data packets, since the deferral by the network station contributes to the idle portion of the assigned bandwidth.

If in step 66 the MAC determines while waiting the minimum IPG that there is no carrier sense, the MAC 22 will check in step 72 whether the delay credit counter 162 has a value greater than or equal to zero in step 72. If the counter value of the delay credit counter 162 is less than zero, the MAC 22 returns to step 66 and defers transmission, in order to wait an additional time interval according to the assigned rate ($r_{asn}$). The delay credit counter is also incremented in step 73 (corresponding to step 58) since the waiting of the minimum IPG following deassertion of the carrier contributes to the idle portion of the assigned rate. However, if in step 72 the delay credit counter is greater than or equal to zero, indicating that the network station has sufficient delay credit according to the corresponding assigned bandwidth ($r_{asn}$), then the MAC 22 transiits the data packet in step 74. After the MAC 22 has initiated transmission of the data packet in step 74, the MAC 22 checks in step 76 whether a collision has been encountered. If a collision is detected in step 76, the MAC 22 performs collision mediation, as described below with respect to FIG. 4. If the MAC 22 does not encounter a collision in step 76, the MAC 22 determines the length of the transmitted packet (p) in step 78, which is supplied from the FIFO controller 44. The MAC 22 then uses a delay count calculator to determine a delay count ($C_R$) that specifies the number of data bytes that must be weighted generally due to the transmission of the data packet having length (P). Specifically, the delay count calculator 164 calculates in step 80 the delay count according to the equation $C_R = P \times (R/r_{asn} - 1)$ in order to determine the delay count.

As described above, the delay count ($C_R$) corresponds to a theoretical delay necessary by the network station in order to achieve the assigned bandwidth ($r_{asn}$) following transmission of the corresponding data packet having length (P). In full-duplex networks, the delay count ($C_R$) could be used as the minimum interframe spacing in order to ensure the assigned bandwidth. In half-duplex networks, however, the network station does not have full control over the transmission of data packets. In some cases, the network station may need to wait an inordinate amount of time before transmitting the data packet. Conversely, a network station aggressively contending for access of the media may be able to capture the media without some delay mechanism.

Hence, the use of the delay credit counter 162 enables the MAC 22 to track the required delay intervals to satisfy the assigned bandwidth. Once the MAC 22 calculates the delay counter ($C_R$), the MAC 22 decrements the delay credit counter 162 in step 82 by the calculated delay count ($C_R$) (corresponding to step 56 of FIG. 3A) and returns to step 66 to transmit another data packet.

The following example illustrates the scheduling of the packets on the medium 50. Referring to the three-station network 42 of FIG. 2, assume that station A has an assigned bandwidth of 20%, station B has an assigned bandwidth of 40%, and station C has an assigned bandwidth of 25%. The total bandwidth is 90%, accounting for occasional collision contention and resolution. Further, for illustrative purposes, assume each station has a fixed packet length, where $P_A$=100bytes, $P_B$=200 bytes, and $P_C$=500 bytes. If station A transmits a packet, then its interpacket gap should equal 400 bytes as calculated in step 80. Similarly, the interpet gap for station B and station C are 300 bytes and 1500 bytes, respectively. Table 1 describes the scheduling of packets according to the method of FIGS. 3A and 3B.

TABLE 1

| A (Packet Size 100) | | B (Packet Size 200) | | C (Packet Size 500) | |
|---|---|---|---|---|---|
| CTR | $C_{R-A}$ | CTR | $C_{R-B}$ | CTR | $C_{R-C}$ |
| 0 | 0 | — | 0 | — | 0 | — |
| 1 | −400 | 400 | 100 | — | 100 | — |
| 2 | −200 | — | −200 | 300 | 300 | — |
| 3 | 300 | — | 300 | — | −1200 | 1500 |
| 4 | −100 | 400 | 400 | — | −1100 | — |
| 5 | 100 | — | 100 | 300 | −900 | — |
| 6 | 300 | — | −200 | 300 | −700 | — |

As shown in row 0 of Table 1, the credit counters are initialized to zero at step 64. In row 1, only station A has a packet to send, and the interpacket delay count $C_{R-A}$ is calculated to be 400 bytes. Therefore, the credit counter 162 for station A is set to −400 (CTR). The credit counters for stations B and C, having counted the transmitted data packets in step 70, increment the corresponding counters 162 to equal the number of transmitted bytes, namely 100 bytes.

Row 2 shows the transmission of a packet by station B, assuming no collisions. The delay count ($C_{R-B}$) is calculated to be 300, such that the delay credit counter 162 for station B is set to 100−300=200. The credit counters 162 for stations A and C are incremented by the packet length transmitted by station B (i.e., incremented by 200 bytes). Row 2 shows only C has a positive credit. Hence, station C can transmit, resulting in the credit updates shown in row 3.

Row 3 shows both A and B have positive credit. Since both stations A and B can transmit, the resulting transmissions will likely result in a collision, described below. Assuming that station A wins the collision, the credit counters are updated as shown in row 4. Row 5 shows the updates after transmission by station B, since station B is the only one having a positive credit (as shown in row 4). Row 6 shows the updates after transmission by B, assuming B won the collision resolution.

In the event that two or more stations with positive credit encounter a collision, a collision mediation according to the present invention modifies the conventional TBEB algorithm to provide a station having a greater percentage of assigned bandwidth to have a greater probability of winning the collision resolution. Specifically, Ethernet 802.3 protocol specifies a truncated binary exponential backoff (TBEB) algorithm. According to the truncated binary exponential backoff algorithm, a station keeps track of the number of transmission attempts (j) during the transmission of a current frame. The station computes a collision backoff interval as a randomized integer multiple of a slot time interval, and attempts retransmission after the collision backoff interval. The station will attempt to tansmit under the truncated binary exponential algorithm a maximum of sixteen times.

The collision backoff interval is calculated by selecting a random number of slot times from the range of zero to $2^j-1$. For example, if the number of attempts j=3, then the range of randomly selected number of slot times is [0,7]; if the randomly-selected number of slot times is four, then the collision backoff interval will be equal to four slot time intervals. According to Ethernet protocol, the maximum range of randomly selected slot times is $2^{10}-1$.

According to the present invention, the range of integers calculated from the exponential number of access attempts is divided into a lower range and upper range, where the lower range includes the lower half of the range of slot times, and the upper range includes the upper half of the range of slot times. For example, the range of slots for a first collision (n=1) is 0 and 1. In this case the lower range (group 1) would have 0 slot times and the upper range (group 2) would have 1 slot times. For n=2, two groups would be 0, 1 and 2, 3. Table 2 illustrates the groups of slot times based on the number of encountered collisions.

TABLE 2

| N | Group 1 | Group 2 |
|---|---|---|
| n = 1 | 0 | 1 |
| n = 2 | 0,1 | 2,3 |
| n = 3 | 0,1,2,3 | 4,5,6,7 |
| n = 4 | [0,7] | [8,15] |
| n = 5 | [0,15] | [16,31] |
| etc. | | |

Figure 4:
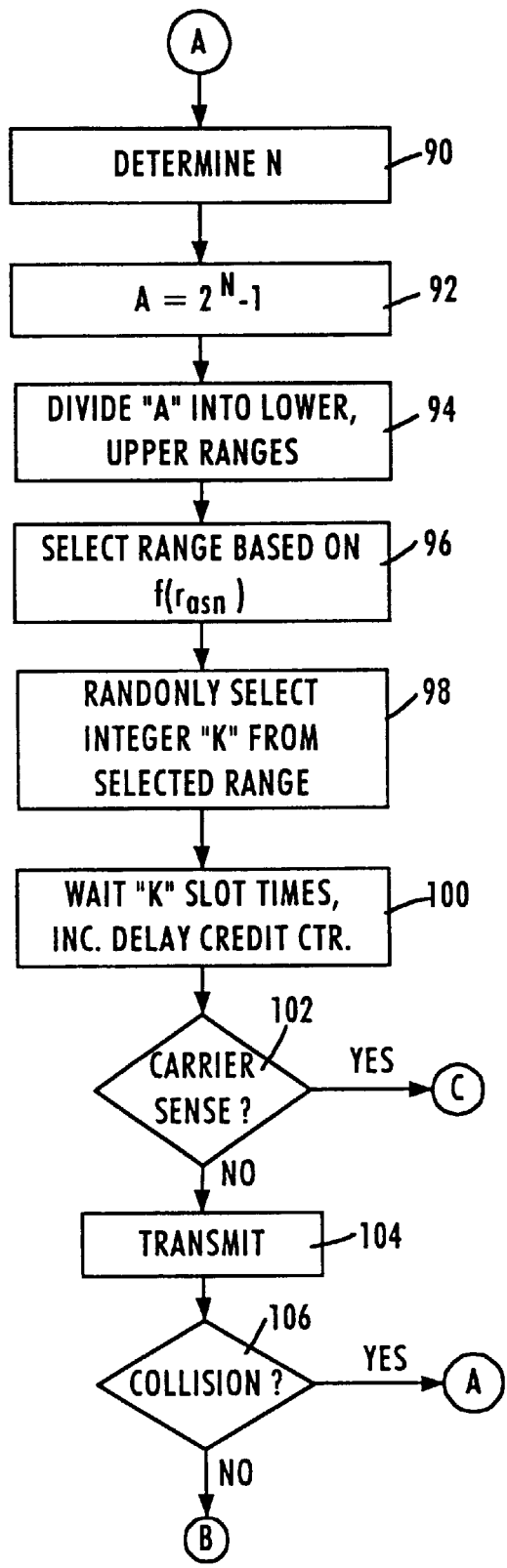
FIG. 4 is a flow diagram illustrating a method of mediating collisions according to an embodiment of the present invention.

As shown in FIG. 4, the MAC 22 determines the number of encountered collisions in step 90, and calculates the exponential number of access attempts (A) in step 92. The range of integers is then divided in step 94 into an upper range and a lower range, and the MAC 22 then selects either range group 1 or range group 2 based on the probability function f(rasn) in step 96. According to the probability function, a station having 30% assigned bandwidth has a 30% chance of selecting group 1, and a 70% chance of selecting group 2, whereas a network station having 70% assigned bandwidth has a 70% chance of selecting group 1, and a 30% chance of selecting group 2. Hence, a station having a greater assigned bandwidth has a greater probability of selecting group 1, resulting in a greater probability of winning the collision mediation.

After selecting one of the groups in step 96, the MAC 22 then randomly selects an integer (k) from the selected group in step 98. After randomly selecting the integer k from the selected range (e.g., from group 1 or group 2 of Table 2), the MAC 22 performs collision mediation in step 100 by waiting k number of slot times, while at the same time continuing to increment the delay credit counter as described above with respect to step 58. After waiting the collision delay interval specified by the k number of slot times in step 100, the MAC 22 checks in step 102 for the presence of a carrier while waiting the minimum IPG. If in step 102 the carrier is sensed, then the method returns to step 68, since the network station has lost contention to another network station transmitting data. However, if in step 102 the MAC 22 does not sense a receive carrier, the MAC 22 transmits the data packet in step 104. The MAC 22 then checks in step 106 to determine whether a collision has been detected. If another collision is encountered, then the MAC 22 repeats the collision mediation, beginning at step 90. However, if transmission occurs without collision, then the MAC 22 returns to step 78 to determine the next delay count.

As shown above, the disclosed embodiment achieves rate control in a shared medium by scheduling packets on the medium. Bandwidth is improved by eliminating one or many stations from contending access to the medium, reducing the likelihood of collision based on the scheduling of packets according to the assigned rate. Typically shared mediums can support 30% to 40% of the bandwidth. The disclosed arrangement is expected to improve the bandwidth efficiency by an additional 10%.

Figure 5:
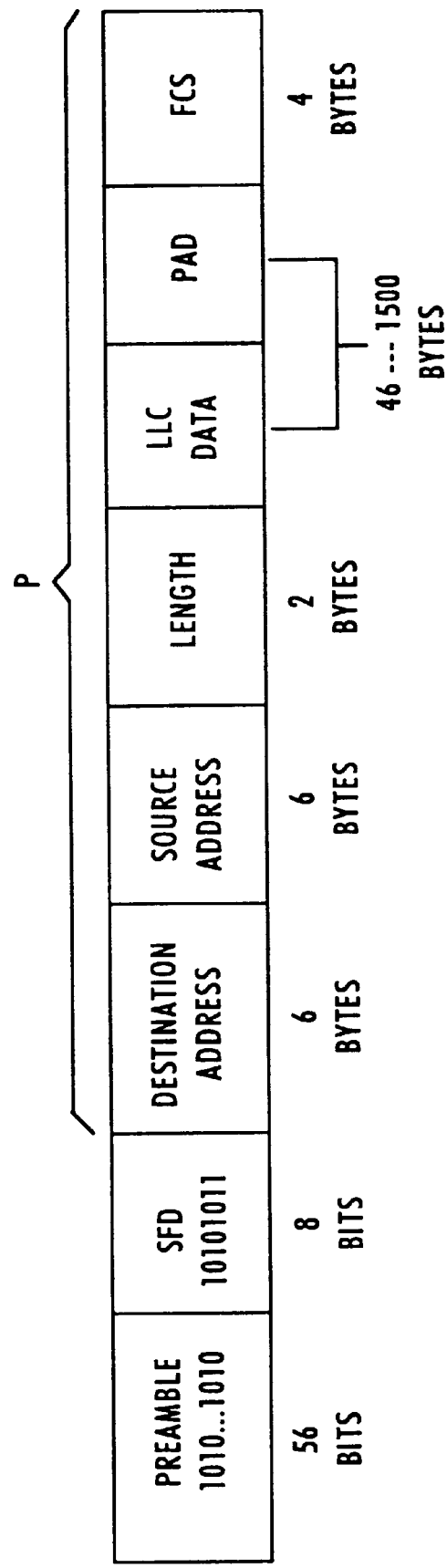
FIG. 5 is a block diagram of a data packet output by the network interface of FIG. 1.

FIG. 5 is a diagram illustrating a data packet output in accordance with ISO 8802-3 (IEEE/ANSI 802.3). As shown in FIG. 5, the size (P) of the data packet is determined by number of bytes in the transmitted packet, exclusive of the preamble and the Start Frame Delimiter (SFD) of the data packet transmitted onto the media 50. Information regarding the size of the data packet (P) is obtained from an internal MAC 22 counter that counts the number of transmitted bytes. Alternately, the length can be determined based on the length field (Length) of the transmitted data frame.

Figure 6:
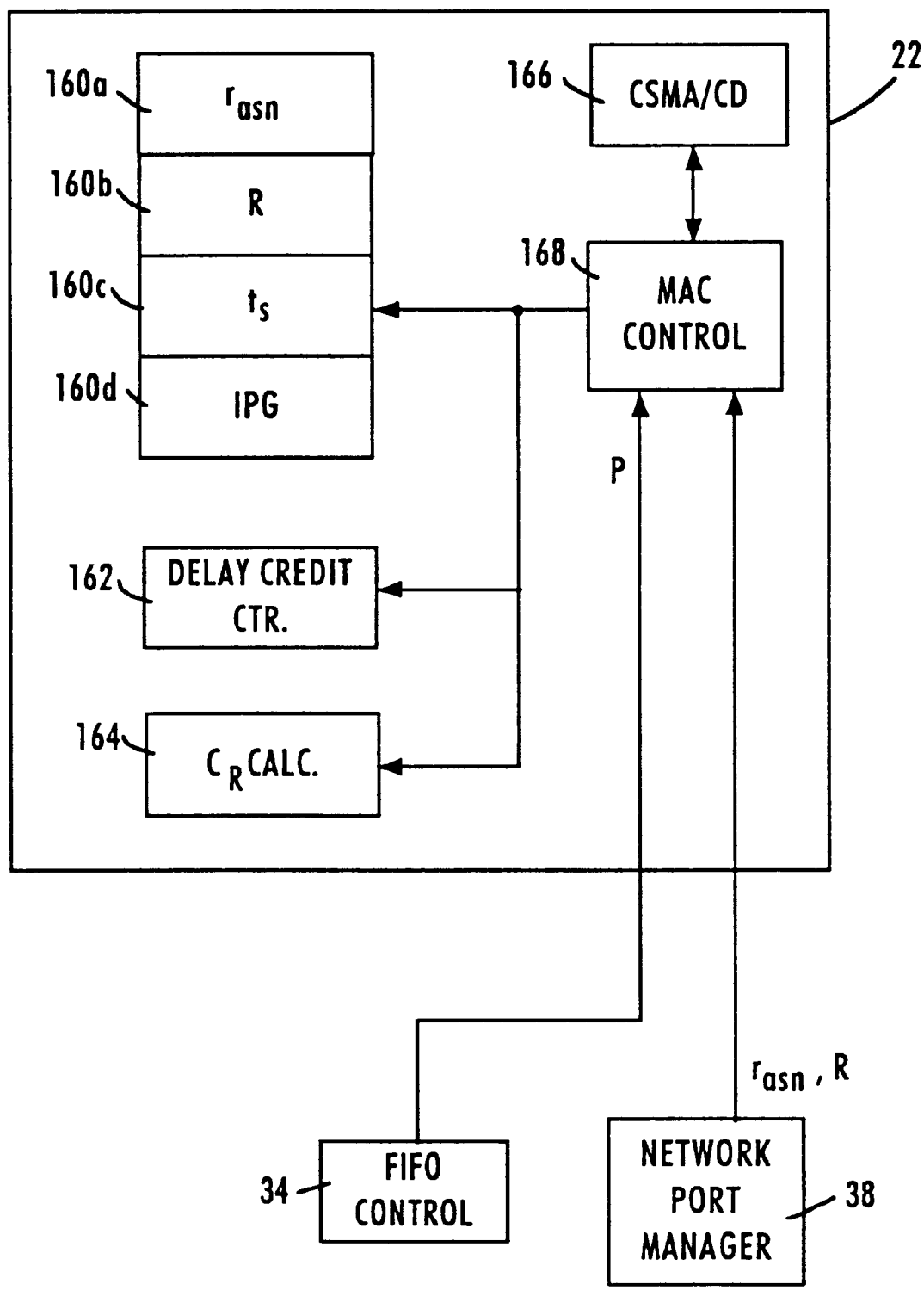
FIG. 6 is a block diagram of the media access control (MAC) of FIG. 1.

FIG. 6 is a block diagram of the media access control 22 of FIG. 1. The MAC 22 of FIG. 6 includes memory elements 160a–d storing the assigned transmission rate ($r_{asn}$), the network transmission rate (R), the predetermined slot time ($t_s$), and the predetermined IPG corresponding to the network transmission rate, respectively. The MAC 22 also includes a delay credit counter 162 for determining the delay interval between transmissions based on the assigned rate and the number of transmitted bytes, and a delay count calculator 164 for calculating the above-described delay count ($C_R$). The MAC 22 also includes a CSMA/CD portion 166 that detects network activity including transmission of valid data frames by other network stations, and a MAC control 168 that controls incrementing and decrementing of the delay credit counter 162 based on the number of transmitted packets (P) as supplied by the FIFO control 34 and the valid data frames detected by the CSMA/CD portion 166.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. A method in a network station for transmitting data packets onto half-duplex network media, comprising:

transmitting a first data packet of identified size onto the media;

deternnining a delay count based on a prescribed transmission rate, a network media transmission rate, and the identified size; and waiting a delay interval, based on the determined delay count and detected network activity, following the transmitting step before attempting to access the half-duplex network media for transmission of a second data packet.

2. The method of claim1, wherein the waiting step comprises monitoring the network activity following the transmitting step to determine an end of the delay interval.

3. The method of claim 2, wherein the monitoring step comprises counting a number of bytes transmitted by another network station on the half-duplex network media, the end of the delay interval based on the counted number of bytes.

4. The method of claim 3, wherein the determining step comprises calculating the delay count as a number of bytes corresponding to the identified size multiplied by a transmission rate factor, the transmission rate factor corresponding to the prescribed transmission rate relative to the network media transmission rate.

5. The method of claim 1, wherein the waiting step comprises;

setting a counter based on the determined delay count;

detecting the network activity by determining a number of bytes transmitted by another network station; and counting the counter value toward zero based on the detected number of bytes transmitted said another network station.

6. The method of claim 5, further comprising transmitting the second data packet on the half-duplex network media after the counter value passes zero.

7. The method of claim 6, wherein the waiting step further comprises decrementing the counter following transmission of the second data packet based on an identified number of bytes in the second data packet and the prescribed transmission rate relative to the network media transmission rate.

8. The method of claim 7, wherein the counting step comprises incrementing the counter from a negative counter value toward zero for each of the number of bytes transmitted by said another network station.

9. The method of claim 6, further comprising:

detecting a collision on the half-duplex network media during the transmitting of the second data packet;

selecting a number of slot time intervals as a collision backoff interval based on the prescribed transmission rate.

10. The method of claim 1, further comprising:

transmitting the second data packet after the waiting step;

detecting a collision on the half-duplex network media during the transmitting of the second data packet; and selecting a number of slot time intervals as a collision backoff interval based on the prescribed transmission rate.

11. The method of claim 10, wherein the selecting step comprises:

providing a range of integers based on an exponential number of access attempts corresponding to the transmission of the second data packet;

dividing the range of integers into a lower range and an upper range;

selecting one of the lower range and the upper range according to a probability corresponding to the prescribed transmission rate relative to the network media transmission rate; and randomly selecting an integer from the selected range to obtain the number of slot time intervals.

12. The method of claim 1, further comprising:

receiving the prescribed transmission rate from a network manager; and storing the received desired transmission rate in the network station.

13. A network interface for connection with half-duplex network media, composing:

a transmit buffer for storing a first data packet to be transmitted on the half-duplex network media;

a buffer controller configured to determine a size of the first data packet; and a media access controller for transmitting the first data packet on the network media, the media access controller configured to wait at least a delay interval after the transmission of the first data packet before transmitting a second data packet onto the network media, the media access controller determining the delay interval based on the first data packet size, a prescribed transmission rate relative to a network media transmission rate, and detected bytes transmitted by another network station.

14. The network interface of claim 13, wherein the media access controller comprises:

a sensor configured for detecting the bytes transmitted by another network station; and a counter configured for being decremented by a delay count following transmission of the first data packet and incremented based on the detected bytes, the delay interval ending based on the counter incrementing past zero.

15. The network interface of claim 14, wherein the media access controller firther comprises a delay count calculator configured for calculating the delay count based on the determined size of the first data packet multiplied by a transmission rate factor, the transmission rate factor corresponding to the prescribed transmission rate relative to the network media transmission rate.

16. The network interface of claim 13, wherein the media access controller comprises:

an attempt counter counting a number of access attempts in transmitting a corresponding data packet encountering collisions; and a collision backoff interval calculator for selecting a number of slot times based on the number of access attempts and the prescribed transmission rate relative to the network media transmission rate.

17. The network interface of claim 16, wherein the collision backoff calculator comprises:

a range calculator determining an upper range and a lower range of integers based on an exponential number of the access attempts; and a selector configured for selecting one of the lower range and the upper range according to a probability corresponding to the prescribed transmission rate relative to the network media transmission rate, the selector randomly selecting an integer from the selected one range to obtain the selected number of slot times.

18. A method for mediating collisions encountered on a network media in a network station, comprising:

detecting a collision on the network media during transmission of a data packet;

determining a number of access attempts for transmitting the data packet;

providing a range of integers based on an exponential number of the access attempts;

dividing the range of integers into a lower range and an upper range;

selecting one of the lower range and upper range according to a probability corresponding to the prescribed transmission rate relative to the network media transmission rate; and randomly selecting an integer from the selected range and using the selected integer to identify an integer multiple of slot times as a collision backoff interval.

* * * * *